L. D. HUGHES.
TIRE.
APPLICATION FILED JUNE 4, 1915.
1,188,177. Patented June 20, 1916.
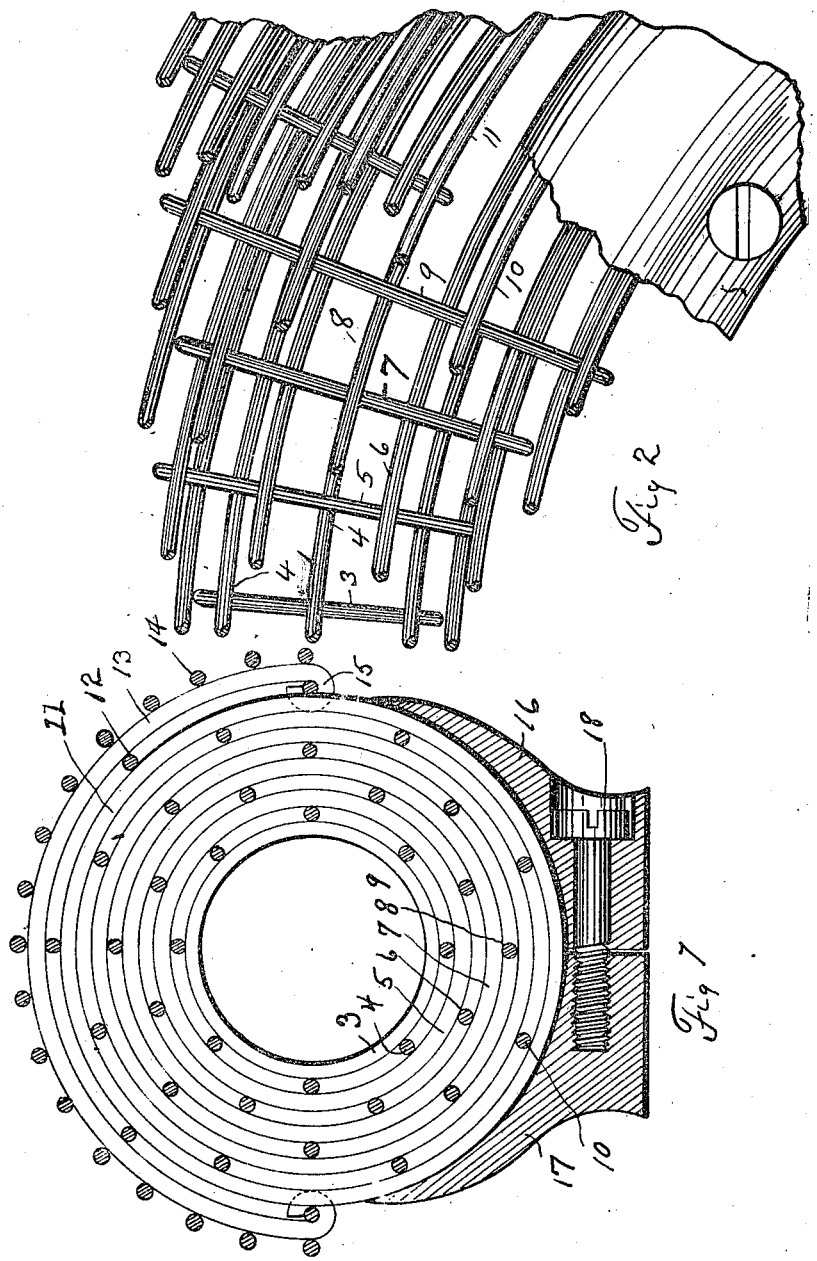
Witnesses
INVENTOR

UNITED STATES PATENT OFFICE.

LAWRENCE D. HUGHES, OF OKLAHOMA, OKLAHOMA.

TIRE.

1,188,177.　　　Specification of Letters Patent.　　Patented June 20, 1916.

Application filed June 4, 1915. Serial No. 32,155.

*To all whom it may concern:*

Be it known that I, LAWRENCE D. HUGHES, a citizen of the United States, and a resident of the city, county, and State of Oklahoma, have invented new and useful Improvements in Tires, of which the following is a specification.

This invention has reference to a metallic composite automobile tire.

It is an object of the invention to produce a wear proof tire, especially so far as the tread is concerned, and one which will prevent slipping on wet pavements and in the mud and sand, and one possessing other mechanically attractive qualities to appear from a further reading of the following specification.

On the sheet of drawings, accompanying and forming a part of this specification, Figure 1 is a transverse section of my tire; Fig. 2 is a fragmental longitudinal view, parts being broken away.

The tire is constructed from that material that is commonly known as wire fabric—fence wire—for instance, or such other fabric as may be specially constructed for this purpose and the rings of which are or may be welded together in any suitable manner, electrically for instance.

The tire is built in sections—longitudinal sections superimposed so that the rings of one section will stagger the rings of another section, so that the longitudinal rings overlapping the cross rings will give, and thus form a resilient tire of the type named. After this building is complete, there is what will be known in the trade as a tread, which when worn can be replaced, and these treads can be purchased independent of the tires.

Now referring in detail to the drawing to describe the invention, 3 designates the inner rings, with the longitudinal rings 4, substantially equidistantly disposed about the formation, and, whether or not at this juncture the rings are welded is immaterial, for the final product will be welded in place. Upon this central core is mounted another similar construction, only larger in diameter, consisting of the cross rings 5, and the longitudinal rings 6, both the rings 5 and rings 6 staggering between the rings 3 and rings 4; then comes the next construction, consisting of the rings 7 and rings 8, and then the rings 9 and rings 10, all staggeredly related, and then a final construction of rings 11 and rings 12. Of course this building can be carried out further, if desired. Now by the staggering of the layers so that the cross rings and longitudinal rings do not lay piled on one another, in the sense that they are under one another, there is created a resiliency by allowing each transverse ring and each longitudinal ring to rest upon two others of another layer, which will give and form a spring action. To this finished product there may be applied a tread 13, having longitudinal rings 14, and the cross rings of this tread are hooked as at 15 about the longitudinal rings 12 of the finishing layer of the tire. This tire is then gripped between two housings or ferrules 16 and 17, and held by a screw 18 in the usual manner well known in the art. Thus it will be seen that there is provided a practical and efficient tire capable of cheap manufacture and which will be durable and give in one tire many of the qualities to gain which now require special appliances on other tires.

When the structure is built, the longitudinal rings and cross rings may be welded electrically, and thus held in place, relatively to prevent slipping and thus increase the efficiency of the device.

Having thus described this invention, I claim:

1. A tire consisting of superimposed layers of longitudinal and transverse rings, the longitudinal and transverse rings of one layer being staggered with respect to the longitudinal and transverse rings of other layers, to create resilience, and means to hold the tire in place on the wheel.

2. A tire consisting of superimposed layers of longitudinal and transverse rings, the longitudinal and transverse rings of one layer being staggered with respect to the longitudinal and transverse rings of other layers, to create resilience means to hold the tire in place on the wheel and a metallic tread for said tire.

Signed at Oklahoma, in the county and State of Oklahoma, this first day of June, in the year of our Lord, nineteen hundred and fifteen.

LAWRENCE D. HUGHES.